United States Patent

Montgomery

[15] 3,680,715
[45] Aug. 1, 1972

[54] BUILDING MATERIALS TRANSPORTING AND HANDLING APPARATUS

[72] Inventor: Thurman R. Montgomery, 2017 Hurstview Dr., Hurst, Tex. 76053

[22] Filed: Dec. 28, 1970

[21] Appl. No.: 101,883

[52] U.S. Cl. ............................214/1 QE, 280/47.12
[51] Int. Cl. ................................................B65g 7/00
[58] Field of Search .....214/1 Q, 1 QE, 1 QD, 130 R, 214/130 A, 130 C

[56] References Cited

UNITED STATES PATENTS

| | | | |
|---|---|---|---|
| 2,251,731 | 8/1941 | Daniels | 214/1 QE X |
| 2,910,304 | 10/1959 | Caylor | 214/1 QE X |
| 2,424,258 | 7/1947 | Smith | 214/1 QE X |

FOREIGN PATENTS OR APPLICATIONS

| | | | |
|---|---|---|---|
| 317,031 | 11/1969 | Sweden | 214/1 QE |
| 816,491 | 10/1951 | Germany | 214/1 QE |
| 223,206 | 8/1959 | Australia | 214/1 Q |

Primary Examiner—Gerald M. Forlenza
Assistant Examiner—Frank E. Werner
Attorney—Eddie M. Scott

[57] ABSTRACT

Building materials are stacked and secured on an "L" shaped frame. Wheels on the bottom of the frame allow the material to easily be transported through narrow passageways. Curved members on the side of the frame allow the material to be placed in a horizontal position and unloaded.

10 Claims, 2 Drawing Figures

PATENTED AUG 1 1972 3,680,715

BUILDING MATERIALS TRANSPORTING AND HANDLING APPARATUS

BACKGROUND OF THE INVENTION

The present invention relates to the art of material handling and more particularly to a device for transporting and handling flat elongated materials.

The transportation and handling of building materials such as sheetrock, plywood, wallboard and other materials of similar shape has always been a difficult and time consuming operation, requiring two or more workers. These materials are bulky and heavy and certain types of these materials may easily be damaged. It is very often necessary to transport the materials through narrow passageways. For example, at the construction site the materials will be transported through doors and hallways and between obstacles. The materials will then be placed in a horizontal position for further distribution or for stacking. A need clearly exists for a simple device that will allow one man to transport this type of material through narrow passages and then unload them in a simple and expedient manner.

DESCRIPTION OF THE PRIOR ART

The most extensive prior art method of transporting and handling building materials is simply by two or more workers carrying sections of the material and depositing them at the desired location. This however includes the disadvantages and problems associated with the great weight of the materials, the possibility of the materials being damaged and the amount of time consumed by the operation.

The use of load dollies and platform trucks also is known in handling building materials. This however has the disadvantage that the materials are generally laid on the dolly or platform tuck in a horizontal position and it is impossible to transport them through narrow passages. In addition, much time and energy is wasted handling the materials when loading and unloading. If the materials are placed on the dolly or platform truck in a vertical position to allow it to be transported through narrow passages, two workers are required to steady the load and the loading and unloading is difficult.

SUMMARY OF THE INVENTION

The present invention provides an apparatus that allows one person to transport and unload a multiplicity of sections of building material all in one swift easy operation. The "L" shaped body of the apparatus allows sections of flat elongated materials to be transported in a vertical position and unloaded to a horizontal position at the desired destination. The bottom of the body is provided with wheels, rollers or other means to allow the apparatus to be easily moved, loaded or unloaded, to the desired location. The side members include a curved portion that allows the position of the load to be changed to the horizontal and the load to be deposited at precisely the desired location.

The load is firmly held in place on the "L" shaped body by suitable means such as a strap. The apparatus may be hoisted to elevated locations with the load in position which simplifies its use in multi-story buildings. Rollers or other conveyor means are provided on the side members to facilitate unloading.

It is therefore an object of the present invention to provide a device that will transport loads of flat elongated materials through narrow openings and unload them in one swift easy operation.

It is a further object of the present invention to provide a device that will allow one man to transport and unload sections of sheetrock, plywood, wallboard or other materials of similar shape.

It is a still further object of the present invention to provide a device that carries a flat elongated load in a vertical position to allow it to be moved through narrow passageways and deposits the load in a horizontal position.

It is a still further object of the present invention to provide a compact and sturdy device for handling building materials.

It is a still further object of the present invention to provide a simple, inexpensive and reliable device for handling building materials.

The above and other objects and advantages of the present invention will become apparent from a consideration of the following detailed description of the invention when taken in conjunction with the accompanying drawing.

DETAILED DESCRIPTION OF THE INVENTION

Figure 1:
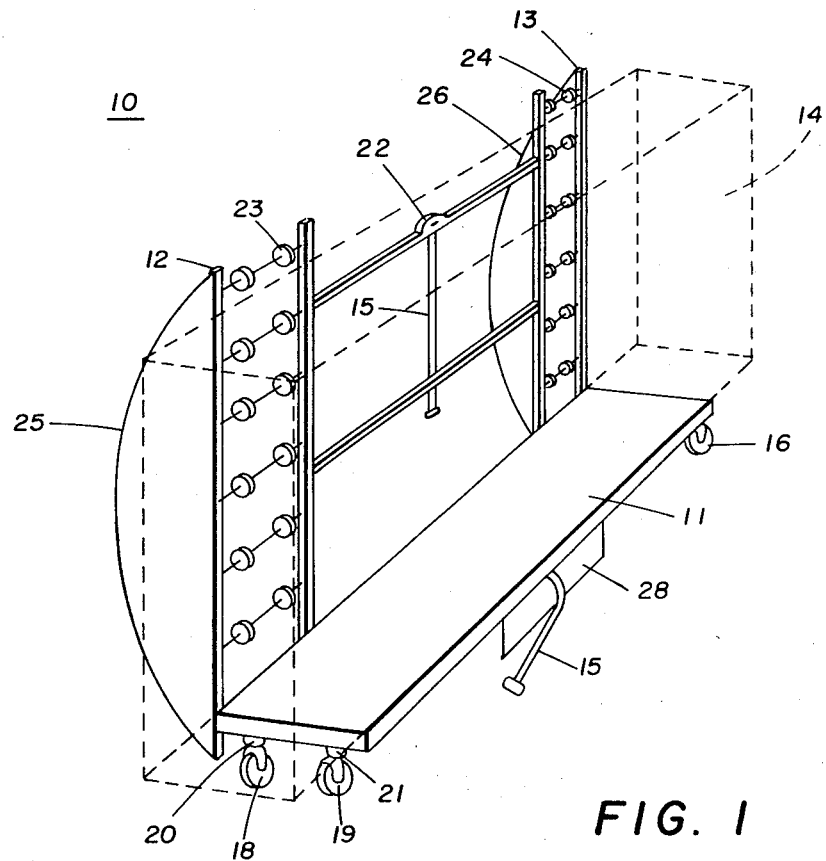
FIG. 1 illustrates an embodiment of the invention with a load of building materials shown in phantom.

Referring now to FIG. 1 an apparatus constructed in accordance with the present invention is shown in general at 10. The apparatus 10 includes a generally rectangular base 11. Base 11 is shown as a flat rectangular plate, however it is to be understood that it may vary in shape. Side frame members 12 and 13 are connected to base 11 and extend above it in substantially perpendicular fashion.

A load 14 is shown in phantom mounted on base 11. The load 14 may consist of a multiplicity of sheets of sheetrock, plywood, wallboard, or other material of similar shape or of a single piece of material having a flat elongated shape. The load 14 is stabalized by side frame members 12 and 13 and may be securely held in place by a belt 15,15'. A multiplicity of wheels, 16, 17, 18 and 19 allow the load 14 to be easily transported and by virtue of the load's vertical position it may be moved through narrow passages. Wheels 18 and 19 are positioned in swivels 20 and 21 to allow the load to be maneuvered during transportation. Instead of wheels, the apparatus 10 could be provided with other means to allow it to be transported.

A loop 22 is positioned between side frames 12 and 13 to provide a connection whereby the apparatus 10, loaded or unloaded, may be lifted to an elevated position such as the upper stories of a building, using a crane or other means. The loop 22 may also be used to set the apparatus 10 in a vertical position when it is loaded in a horizontal position. The loop 22 is engaged with a lift such as a fork lift truck and then raised to a vertical position. Two conveyor sections 23 and 24 are provided along side frames 12 and 13, respectively. The function of conveyor sections 23 and 24 will become apparent as this description proceeds. Side frames 12 and 13 include curved portions 25 and 26 that allow the load 14 to be placed in a horizontal position.

Once the load has been transported to the desired location it is ready to be unloaded. This may be done by tipping the apparatus 10 onto the side with the curved portions 25 and 26. This is easily accomplished by standing on the side opposite the side with curved portions 25 and 26 and pushing on the upper portion of the load 14. The apparatus 10 and load 14 is thereby placed in a horizontal position and all that remains to be accomplished is to remove the apparatus 10 thereby leaving the load 14 at the desired location.

Figure 2:
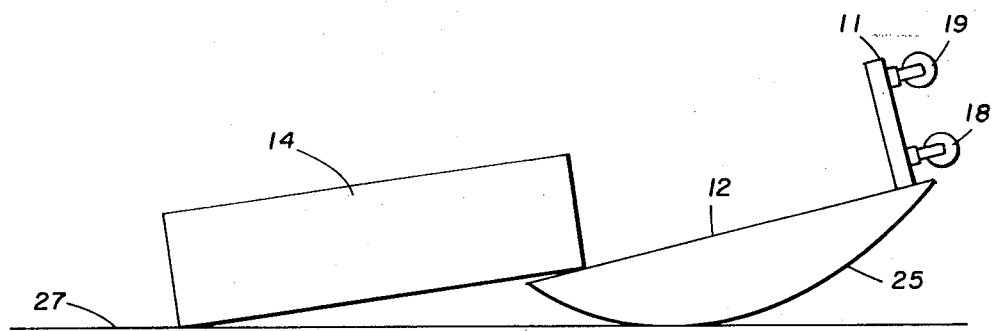
FIG. 2 shows the load being unloaded to a horizontal position.

The apparatus 10 is easily and quickly removed as shown in FIG. 2. After belt 15,15' has been uncoupled, the apparatus 10 is tipped until load 14 comes in contact with the floor or ground surface 27. If the load is not high enough to immediately contact surface 27, it will slide until it does contact surface 27 as base 11 is lifted. The conveyor sections 23 and 24 simplify movement of load 14 along side frame members 12 and 13. The apparatus 10 is then easily and swiftly removed by lifting and pulling base 11. A handle 28 is positioned on base 11 to facilitate movement of apparatus 10. The curved portions 25 and 26 may be overlaid or coated with materials compatible with the surfaces they will contact, to simplify withdrawal of apparatus 10 or to insure that the surface 27 is not damaged or marked.

The present invention has been embodied in an apparatus constructed and tested. When the load and apparatus were tipped onto the curved portions, the load went over easily and did not oscilate nor was the load disturbed or damaged in any way. A single individual was easily able to transport the load about and to withdraw the apparatus in the manner described.

What is claimed is:

1. An apparatus for transporting a load through narrow passageways, comprising: a substantially "L" shaped frame with a generally vertical upright portion and a generally horizontal lower portion, said lower portion adapted to support said load when said load is being transported; wheel means connected to the lower portion of said frame for moving said apparatus when the load is being transported; and a curved member affixed to the upright portion of said "L" shaped frame, extending convexly outwardly for assisting in unloading said load from said apparatus.

2. The apparatus of claim 1 including means on the inner side of said upright portion of the "L" shaped frame for providing relative movement between said frame and a load.

3. The apparatus of claim 2 including strap means connected to said frame for securing said load to said frame.

4. The apparatus of claim 1 wherein said generally horizontal lower portion of said substantially "L" shaped frame is a rectangular base adapted to receive the load.

5. The apparatus of claim 4 wherein said vertical upright portion of said substantially "L" shaped frame includes at least one side frame that extends substantially perpendicular upward from said rectangular base.

6. The apparatus of claim 5 wherein said curved member includes a curved portion of said at least one side frame extending convexly outwardly from said at least one side frame.

7. The apparatus of claim 6 including conveyer means positioned on said at least one side member for allowing movement of the load relative to said substantially "L" shaped frame when the load is being unloaded.

8. The apparatus of claim 7 including means for selectively holding the load in place when the load is being transported and releasing the load when the load is being unloaded.

9. The apparatus of claim 8 wherein said means for selectively holding the load in place when the load is being transported and releasing the load when the load is being unloaded includes a belt connected to said substantially "L" shaped frame for releasably holding the load on said apparatus.

10. The apparatus of claim 9 including connection means on said "L" shaped frame for allowing the frame to be lifted.

* * * * *